Jan. 12, 1932.　　　E. E. WICKERSHAM　　　1,840,481
HARVESTER
Filed Aug. 13, 1928　　3 Sheets-Sheet 1
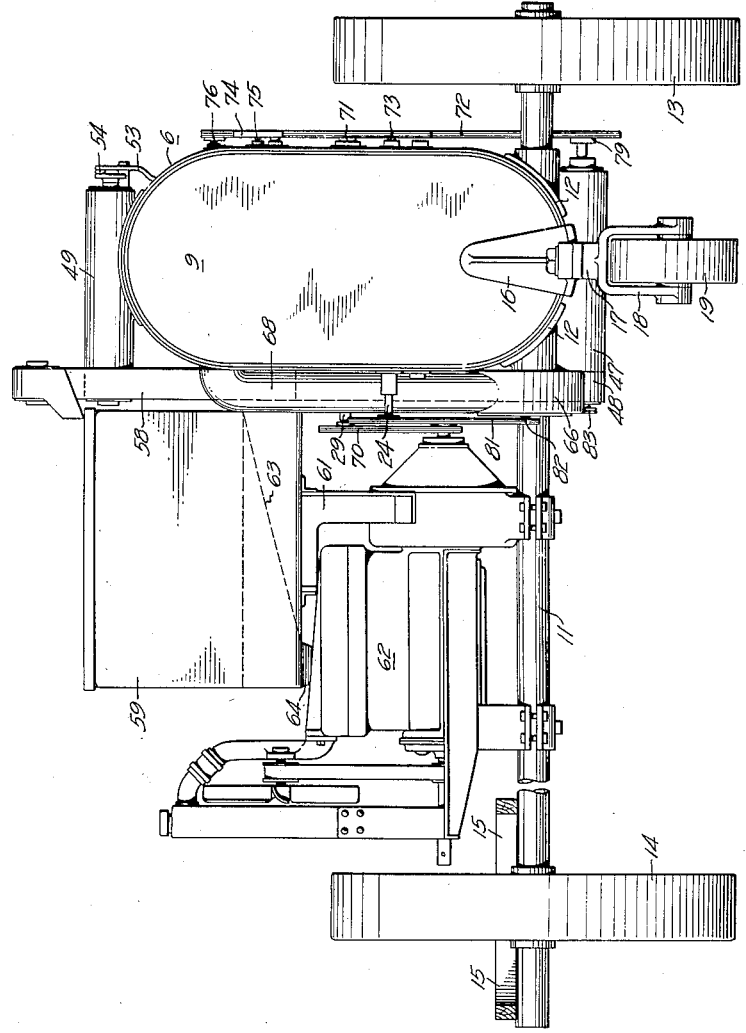
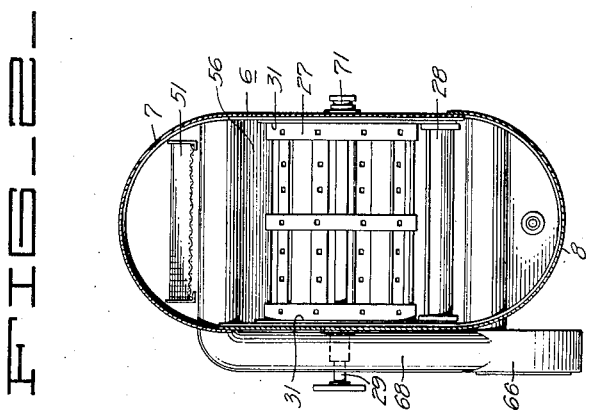
INVENTOR
Elmer E. Wickersham
White, Prost & Fryer
ATTORNEYS

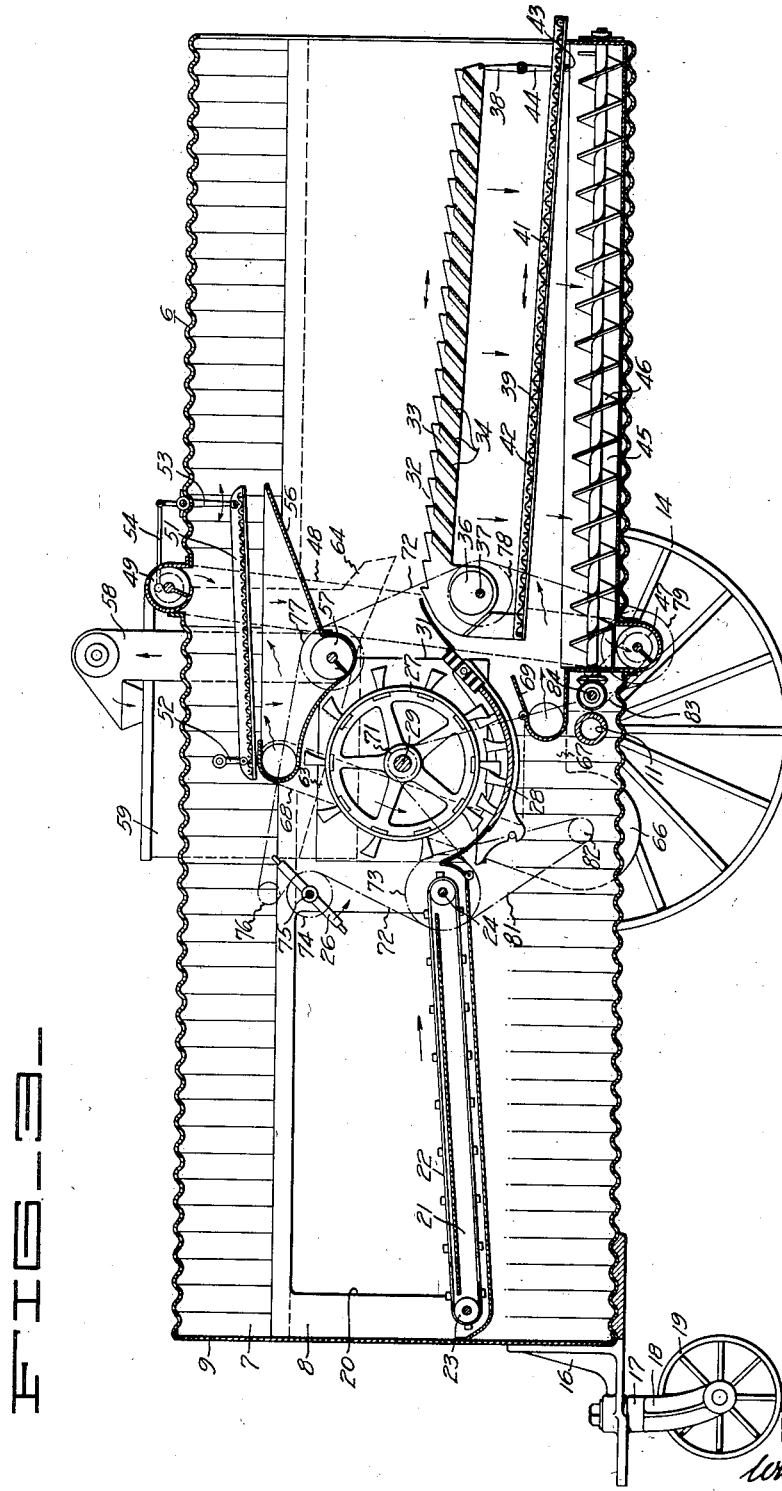

Jan. 12, 1932. E. E. WICKERSHAM 1,840,481
HARVESTER
Filed Aug. 13, 1928 3 Sheets-Sheet 3
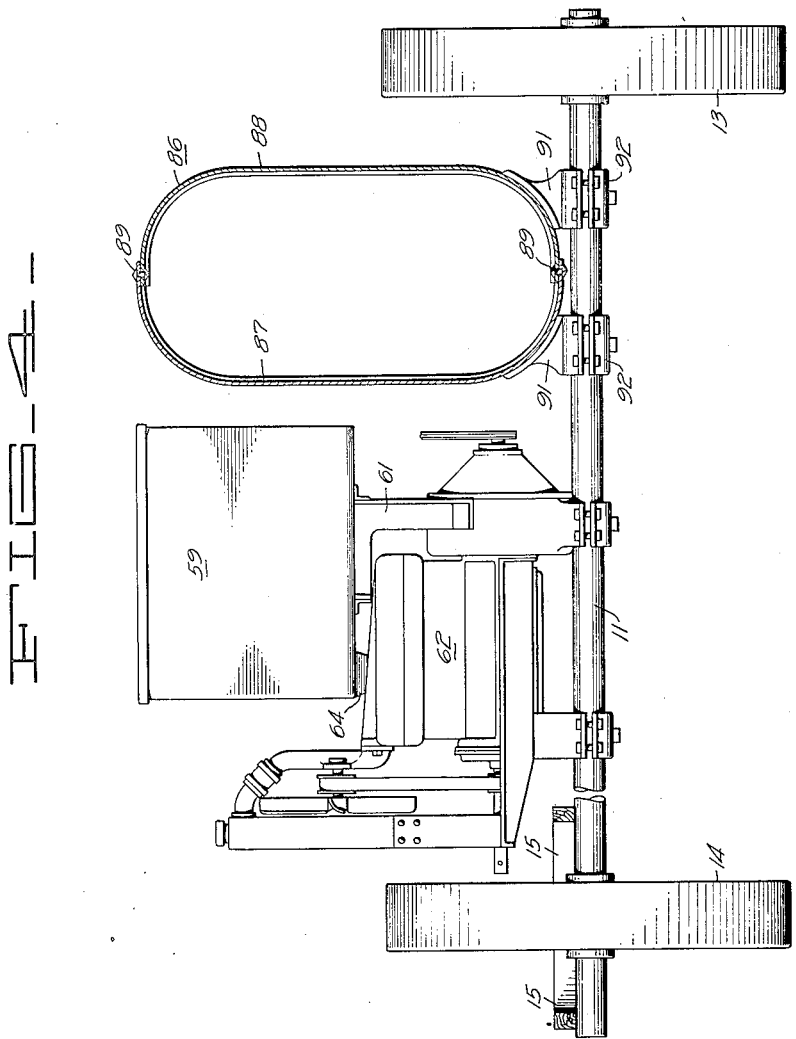
INVENTOR
Elmer E. Wickersham
BY
ATTORNEYS Patented Jan. 12, 1932

1,840,481

UNITED STATES PATENT OFFICE

ELMER E. WICKERSHAM, OF STOCKTON, CALIFORNIA, ASSIGNOR, BY MESNE ASSIGN-
MENTS, TO CATERPILLAR TRACTOR CO., OF SAN LEANDRO, CALIFORNIA, A CORPORA-
TION OF CALIFORNIA

HARVESTER

Application filed August 13, 1928. Serial No. 299,252.

My invention relates to harvesting machinery and particularly to separators for separating the grain kernels from the straw and is especially applicable for use in combined harvesters which usually comprise a header unit for cutting the standing grain and delivering it to a separator unit in which the grain kernels are removed from the straw. Such mechanisms are propelled over fields of standing grain to cut the grain and at the same time thresh it, and are thus subject to racking and twisting strains so that ordinarily a relatively heavy construction must be employed to insure even a moderate life for the vehicle. Furthermore, certain portions of the separating mechanism, notably the cylinder and concave unit, must be rather closely adjusted when in operation to obtain the best results. Extreme care must customarily be exercised in the design and construction of the mounting for the cylinder and concave unit to effect proper functioning under the usual adverse conditions. The ordinary separator body comprises a frame on which are erected a number of sections for enclosing the separating mechanism. It is difficult to fasten these sections together to provide a stable enclosure, and a rigid mounting for the enclosed mechanism even though heavy bracing is employed. It is therefore an object of my invention to improve the body portion of a separator.

Another object of my invention is to provide a body of sufficient strength to permit the customary frame to be omitted.

Another object of my invention is to provide a strong separator body which can be economically and quickly manufactured.

An additional object of my invention is to provide an improved disposition of the various portions of the separating mechanism to lighten the construction and maintain its strength.

The foregoing and other objects are attained in the embodiments of the invention shown in the drawings, in which Fig. 1 is a front elevation of a harvester built in accordance with my invention, a portion of the supporting axle being omitted to reduce the size of the figure.

Fig. 2 is a cross section on a vertical plane of the harvester shown in Fig. 1 particularly disclosing the construction in the vicinity of the cylinder.

Fig. 3 is a cross section on a longitudinal vertical plane of a harvester according to my invention.

Fig. 4 is a front elevation of a modification of my harvester, the shell being disclosed in section on a vertical plane.

In its preferred form, my harvester comprises an ellipsoidal shell composed of a pair of substantially identical sheets of corrugated metal, fastened together in complementary location and forming the body portion of the harvester within which the separating mechanism is mounted and alongside of which the bulk grain bin is situated.

In the particular modification of the invention disclosed in Figs. 1, 2 and 3, there is provided a shell 6 preferably comprised of a pair of metallic sheets 7 and 8 fabricated of corrugated material and bent into substantially a J-shape. The two sheets are arranged complementarily in reverse symmetry and are fastened together to provide an ellipsoidal body. The leading end of the body is closed by a bulkhead 9 while the trailing end is left open. This construction results in the formation of an inherently rigid, strong and light enclosure which is well able to withstand racking strains, which is self-supporting without the use of an auxiliary or supplementary frame and which is easily and quickly manufactured. Adjacent the central portion of the shell 6 a supporting axle 11, preferably of tubular form, passes thru the material of the body with its points of emergence reinforced by pads 12. The location of the axle is preferably such that the completed separator unit substantially balances thereon with a slight preponderance of the load on the forward or leading end. One end of the axle carries a ground-engaging wheel 13, while the other end of the axle 11 is supported on a ground-engaging wheel 14 on either side of which are located balance beams 15 for the header, not shown.

As an auxiliary support for the harvester body 6 and to provide a draft connection, there is secured to the lower forward end of the shell a fitting 16 arranged at its leading end to be attached to a draft vehicle and carrying a boss 17 in which the yoke 18 of a caster wheel 19 is journalled. The caster wheel bears only a portion of the load but assists in steadying the vehicle without hampering it in negotiating sharp turns and in going over rough terrain.

Within the shell 6 is mounted separating mechanism. At the forward end, the shell is pierced by an irregular aperture 20 thru which the header spout, not shown, projects. The spout discharges cut grain onto a Jackson feeder 21 of the customary kind which comprises a belt 22 encompassing a pair of rollers 23 and 24, journaled in the shell. Immediately above the discharge end of the Jackson feeder is a beater 26 of the standard sort journalled likewise in the shell and adapted to assist in feeding the grain from the Jackson feeder into a cylinder 27, and its cooperating concaves 28. The cylinder is mounted on a shaft 29 rotatable in suitable journals secured to the shell and is disposed with the ends of the cylinder in substantial abutment with the flat sides of the ellipsoidal shell 6. This construction is an especial advantage inasmuch as the ordinary cheek pieces arranged at either side of the cylinder to fill in the space between the rectangular cylinder and an irregularly shaped shell can be dispensed with. If desired, however, flat sheets 31, usually of metal, can be placed on the interior of the shell in contact with the peaks of the corrugations to afford only a slight running clearance between the ends of the cylinder and the plates 31.

From the cylinder 27, the grain is discharged upwardly and rearwardly toward the trailing end of the shell 6 and falls onto a straw walker comprising a plurality of straw walker shoes 32. Each of these shoes consists of a pair of side plates 33 joined by vanes 34 situated at an angle and providing apertures thru which grain kernels can pass. The leading ends of the shoes 32 are mounted on eccentrics 36 secured to a cross shaft 37 journalled in the shell 6, while the trailing ends of the shoes are pivoted to an arm 38 also journalled in the shell 6. Upon revolution of shaft 37, the eccentrics cause a rotary movement of the leading ends of the shoes and a substantially horizontal arcuate oscillation of the trailing ends of the shoes. Preferably the various eccentrics 36 are displaced angularly around the shaft 37 with the result that they assume their uppermost positions in sequence. The grain is thus shaken and maintained in a light, fluffy mass permitting the kernels to drop gravitally thru the straw and between the vanes 34. The separated straw is discharged thru the open trailing end of the shell 6 while the dislodged grain falls onto a separator screen 39. The separator screen usually comprises a framework 41 on which is stretched a mesh screen 42. The forward end of the screen frame 41 is preferably secured to one or more of the eccentric straps working in unison, while the rear end of the screen rests on a cross bar 43 suspended between extensions 44 of the pivot arms 38 and moving therewith. A violent agitation of the screen is thus afforded so that the desired kernels of grain pass therethru, while the undesired materials pass out of the open end of the shell 6 over the trailing end of the screen 39. The retained kernels fall onto an arcuate metallic shield 45 situated in the bottom of the shell 6 and partially surrounding a longitudinal grain auger 46. This device propels the grain forwardly of the shell to a cross auger 47 extending transversely of the shell to carry the grain kernels to the lower end of an elevator 48. The grain kernels are lifted by the elevator from the bottom of the shell to the upper portion thereof and are discharged into an auger 49 which distributes them over a cleaner screen 51.

This screen is similar in construction to the separator screen 39 and at its forward end is mounted on a freely oscillatable crank 52 fitted on the shell while its rear end is connected to a crank 53 also fitted on the shell and adapted to be oscillated by a link 54 connected to the distributor auger 49. Grain which is unsuited to pass thru the rapidly agitated screen 51 falls gravitally over the leading end thereof into the cylinder 27 and passes again thru the separating mechanism while the desired and suitable grain falls gravitally thru the screen onto a collector plate 56 mounted in the shell and of such shape as to direct the grain to a cross auger 57 which carries it to an elevator 58 discharging into a bulk grain bin 59.

The bulk grain bin is a receptacle preferably of sheet metal located alongside the shell 6 and mounted on a supporting bracket 61 secured to the engine 62 from which the motive power for the separating mechanism is derived. Since the engine is mounted directly on the axle 11, the bulk grain bin is supported on the axle and exerts little or no pressure on the shell 6. For this reason the shell or body can be made much lighter than it could be if it had to maintain the relatively great weight of the bulk grain bin. Preferably the bottom 63 of the bulk grain bin is sloped toward a discharge spout 64 from which the separated and cleaned grain can be withdrawn from the machine.

To assist in the separating action, I preferably secure a blower 66 to one side of the shell. Tangentially diverging from the blower casing are a pair of conduits 67 and 68. The conduit 67 leads transversely thru the shell 6 and discharges in a rearward and upward direction below the separator screen 39 and the straw walker shoes 32. A damper 69 controls the efflux of air from the conduit 67. The conduit 68 likewise leads transversely thru the shell 6, but discharges above the plate 56 in a rearward and upward direction so that the air flows upwardly thru the cleaner screen 51.

The drive for the various moving parts of the separator mechanism is transmitted from the engine 62 by means of chains. The engine shaft is in engagement with the chain 70 connecting to a sprocket on the cylinder shaft 29 for revolving the cylinder at a relatively high rate of speed. On the far side of the shell 6, cylinder shaft 29 carries a sprocket 71, transmitting movement to a chain 72 which passes under a sprocket 73 on the far side of the shaft 24 for driving the Jackson feeder 21, further passes around a sprocket 74 on the shaft 75 of the beater 26, around an idler 76, thence to a sprocket 77 at the lower end of elevator 58, continuing to a sprocket 78 on shaft 37 and extending around a sprocket 79 on the cross auger shaft 47 and back to the point of beginning. On the near side of the shell 6, adjacent the engine, there is a sprocket on the Jackson feeder shaft 24 carrying a chain 81 which encompasses a sprocket 82 for driving the blower 66. Also on the near side of the shell, a chain 83 driven by the shaft of the cross auger 47 imparts movement to a shaft 84 geared to the longitudinal auger 46.

In the main, the type of my harvester shown particularly in Fig. 4 is identical with the one just described, the chief features of difference being in the construction and mounting of the body. This modified form of shell 86 comprises two substantially identical corrugated sheets 87 and 88, preferably of metal pressed or bulldozed into approximately C-shape. The sheets are placed in reverse symmetry and are fastened together, as by rivets 89. The shell so formed is placed above the axle 11 to facilitate assembly in production and is mounted thereon by saddles 91 fastened to the shell 86 and having removable caps 92 encompassing the axle. It will be appreciated that shell 86 can be provided with separating mechanism in the same manner as shell 6.

A harvester constructed in accordance with the present invention includes a light, strong body of corrugated metal not requiring additional or auxiliary reinforcement and which, because of its peculiar shape, is particularly adapted to receive separating mechanism such as a cylinder and concave unit. Furthermore, the positioning of the bulk grain bin for support directly on the axle relieves a great deal of load from the separator body so that it need not be of excessive strength.

It is to be understood that I do not limit myself to forms of the harvester shown and described herein, as the invention, as set forth in the following claims may be embodied in a plurality of forms.

I claim:

1. A harvester comprising a main body including an ellipsoidal shell, separating mechanism mounted within said shell, an axle for supporting said shell and located so that said shell substantially balances thereon, and an auxiliary support at one end of said shell.

2. A harvester comprising a main body including an ellipsoidal shell of two substantially identical sheets of corrugated metal fastened together in reverse symmetry, and separating mechanism mounted within said shell.

3. A harvester comprising a main body including an ellipsoidal shell of corrugated metal, and a cylinder and concave unit mounted within said shell with the ends of the unit substantially abutting the flat sides of said shell.

4. A harvester comprising an ellipsoidal tube of sufficient rigidity to require no extraneous reinforcement, mechanism within said tube for threshing grain, and an axle for supporting said tube and contained mechanism.

5. In a threshing machine, a wheeled axle, a tube on said axle to support and enclose threshing mechanism, a motor on said axle, and a grain bin on said motor.

6. In a threshing machine, a rigid ellipsoidal shell constituting the sole frame of the machine, a wheeled axle directly connected to said shell and constituting substantially the sole support therefor, and threshing mechanism mounted in said shell and being supported thereby.

7. In a threshing machine, a rigid ellipsoidal shell constituting the sole frame of the machine, a wheeled axle directly connected to said shell and constituting substantially the sole support therefor, and threshing mechanism mounted in said shell and being supported thereby, said axle being parallel to the minor ellipsoidal axis of the shell.

8. In a threshing machine, a rigid ellipsoidal shell comprising two similarly contoured sheets of metal joined at the top and bottom of the shell and constituting the sole frame of the machine, a wheeled axle directly connected to said shell and constituting substantially the sole support therefor, and threshing mechanism mounted in said shell and being supported thereby.

9. In a threshing machine, a wheeled axle, threshing mechanism supported on said axle, a motor directly connected to and supported by said axle, and a grain bin directly connected to and supported by said motor.

In testimony whereof, I have hereunto set my hand.

ELMER E. WICKERSHAM.